(12) United States Patent
Silvers

(10) Patent No.: US 6,265,658 B1
(45) Date of Patent: Jul. 24, 2001

(54) TERMINAL COVER STRIP

(75) Inventor: Steven E. Silvers, Lawrence, KS (US)

(73) Assignee: PTMW, Inc., Meriden, KS (US)

( * ) Notice: Subject to any disclaimer, the term of this patent is extended or adjusted under 35 U.S.C. 154(b) by 0 days.

(21) Appl. No.: 09/497,765

(22) Filed: Feb. 4, 2000

Related U.S. Application Data

(62) Division of application No. 09/373,504, filed on Aug. 13, 1999.

(51) Int. Cl.[7] .................................................. H05K 5/02
(52) U.S. Cl. ................................ 174/51; 361/799
(58) Field of Search ............................ 174/51; 361/799

(56) References Cited

U.S. PATENT DOCUMENTS

| | | | |
|---|---|---|---|
| 3,122,604 | * | 2/1964 | Cook et al. .......................... 174/51 |
| 3,780,209 | * | 12/1973 | Schuplin .............................. 174/51 |
| 3,992,897 | * | 11/1976 | Loos ................................. 174/51 X |
| 5,174,768 | * | 12/1992 | Hewison et al. .................. 174/51 X |
| 5,233,129 | * | 8/1993 | Hall ................................. 174/51 X |
| 5,280,132 | * | 1/1994 | Clarey et al. ..................... 174/51 X |
| 5,805,429 | * | 9/1998 | Andersson .......................... 361/799 |
| 5,880,937 | * | 3/1999 | Schadhauser et al. ............. 174/51 X |

* cited by examiner

Primary Examiner—Dean A. Reichard
Assistant Examiner—Dhiru R Patel
(74) Attorney, Agent, or Firm—Louis Woo

(57) ABSTRACT

In a shield structure built within a housing for enclosing electrical conductors, a terminal cover strip for enhancing efficient grounding is mounted. The terminal cover strip is U-shaped, with one of the upbent sides having a plurality of mounting spaces for coupling with multiple conductors and the other of the upbent sides being connected to a ground plane.

3 Claims, 9 Drawing Sheets

TERMINAL COVER STRIP

CROSS REFERENCE TO RELATED APPLICATION

This is a divisional application of U.S. application Ser. No. 09/373,504 filed Aug. 13,1999.

FIELD OF THE INVENTION

The present invention relates to a housing structure that is equipped with a lightning protective system, and particularly the equipping of a railroad switch house with a lightning protection system for maintaining the integrity of the electrical or electronic equipment stored therein.

BACKGROUND OF THE INVENTION

Signal switch houses for railroads have been around for a long time. Such houses usually have stored therein electrical and/or electronic equipment and other electronic components such as for example relays for monitoring and regulating the operation of trains along railroad tracks to which such houses are adjacently located. Such switch houses are usually spaced anywhere from ¾ to 1½ miles all along the length of the railroad tracks. In essence, the equipment stored in the houses would provide wayside signals to the train, as for example red, yellow and green lights, so that the train engineer has some indication of the condition of the tracks down the line. Moreover, a switch house is usually located at each railroad crossing for providing warnings to traffic crossing the railroad tracks if a train is approaching.

The equipment stored inside each of these switch houses may vary, depending on the kinds of signals that are to be monitored and regulated. However, each of the equipment stored in each of the switch houses tends to be electrical or electronic in nature, and accordingly could be affected by power surges resulting from transients from the power line or lightnings that strike either the railroad tracks adjacent to the house or the house directly. And when the equipment malfunctions, the signals for regulating the movement of trains along the railroad tracks are disrupted.

It has been estimated that it costs a single railroad company thousands of dollars for each unscheduled train stop as the stoppage of one train tends to have a domino effect on all other trains along the same tracks. This is due to the fact when a train is stopped unexpectedly, the tracks would act as a shunt to prevent a proceed signal from being transmitted along the tracks to other switch houses. With the absence of the proceed signal, the equipment in the switch houses downstream or upstream of where the stopped train is would provide a caution yellow light or a stop red light to the train engineers at the other trains to warn them either to slow down or stop.

Prior to the instant invention, there has not been any reliable protection against power surges that may affect the performance of the electrical or electronic equipment in the switch houses. Thus, excessive lightning damage has been sustained by the train control equipment. Such damage not only means that the equipment has to be replaced, but more importantly it affects the operation of the trains along the tracks and therefore causes both inconvenience and a loss of money for the railroad companies.

SUMMARY OF THE INVENTION

The housing structure or house of the instant invention has secured to one of its interior walls a terminal board. Coupled to the terminal board are a number of terminal blocks or strips to which wires may be mounted. A number of openings are provided on the floor of the house for enabling wires external to the house to be inserted into the house. These outside wires are mounted to one of the terminal blocks on the terminal board. The equipment that are inside the house are placed on shelves which are secured to the house. The signal leads or wires that are provided to and from the equipment are also mounted to the terminal board, preferably at another terminal block or strip coupled to the terminal board. There is also coupled to the terminal board at least one conductive terminal strip that is electrically grounded. The wires from outside which are mounted to the terminal block on the terminal board each in turn are connected to the grounding strip by way of a current or lightning arrester. At least one ground plane is provided also on the terminal board so as to enable any power surges that may reach the terminal board to be readily routed to ground.

To confine any power surges that enter the house which most likely first reach the terminal board, a shield structure in the form of interconnected panels are placed over the terminal board so as to enclose at least the portion of the terminal board whereat both the wires from the outside and the wires that are connected to the equipment are located. The panels may be in the form of grids or solid sheets that are made of ferrous or non-ferrous metals. The panels furthermore are connected to ground. Thus, power surges that enter the house and wind up at the terminal board, even if they were to jump over the arresters that connect the outside wires to the terminal grounding strip, nonetheless are prevented by the shield structure from entering into the rest of the house. The power surges are therefore prevented from doing damage to the equipment stored in the house. The shield structure may be in the form of a Faraday cage.

To enhance grounding, in place of conventional grounding strips or terminals, the house of the instant invention utilizes a grounding strip that comprises a longitudinal U shaped member, with a longer side and a shorter side respectively up bending along the length of the member. Multiple holes are provided in the longer up-bent portion for enabling the grounding strip to be mounted to the terminal board. Notches or semi-circular cut-outs are formed at the shorter up-bent side to enable the mounting thereto of the respective wires from the terminal block on the terminal board where the outside wires are mounted.

It is therefore an objective of the present invention to equip a house with lightening protection features.

It is another objective of the present invention to provide a Faraday cage inside a housing structure for confining power surges that may enter the structure.

It is still another objective of the present invention to protect equipment in a housing structure from lightning or power surges that may enter the structure.

It is yet a further objective of the present invention to provide to the terminal board of the house of the instant invention an inventive unitary grounding strip adaptable to be connected by a plurality of wires from the outside the house.

BRIEF DESCRIPTION OF THE FIGURES

The above-mentioned objectives and advantages of the present invention will become apparent and the invention itself will be best understood by reference to the following description of an embodiment of the invention taken in conjunction with the accompanying drawings, wherein:

FIG. 7a is a front view of an inventive terminal cover strip coupled to the terminal board of the instant invention;

FIG. 7b is a side view of the terminal cover strip of FIG. 7a;

DETAILED DESCRIPTION OF THE INVENTION

Figure 1:
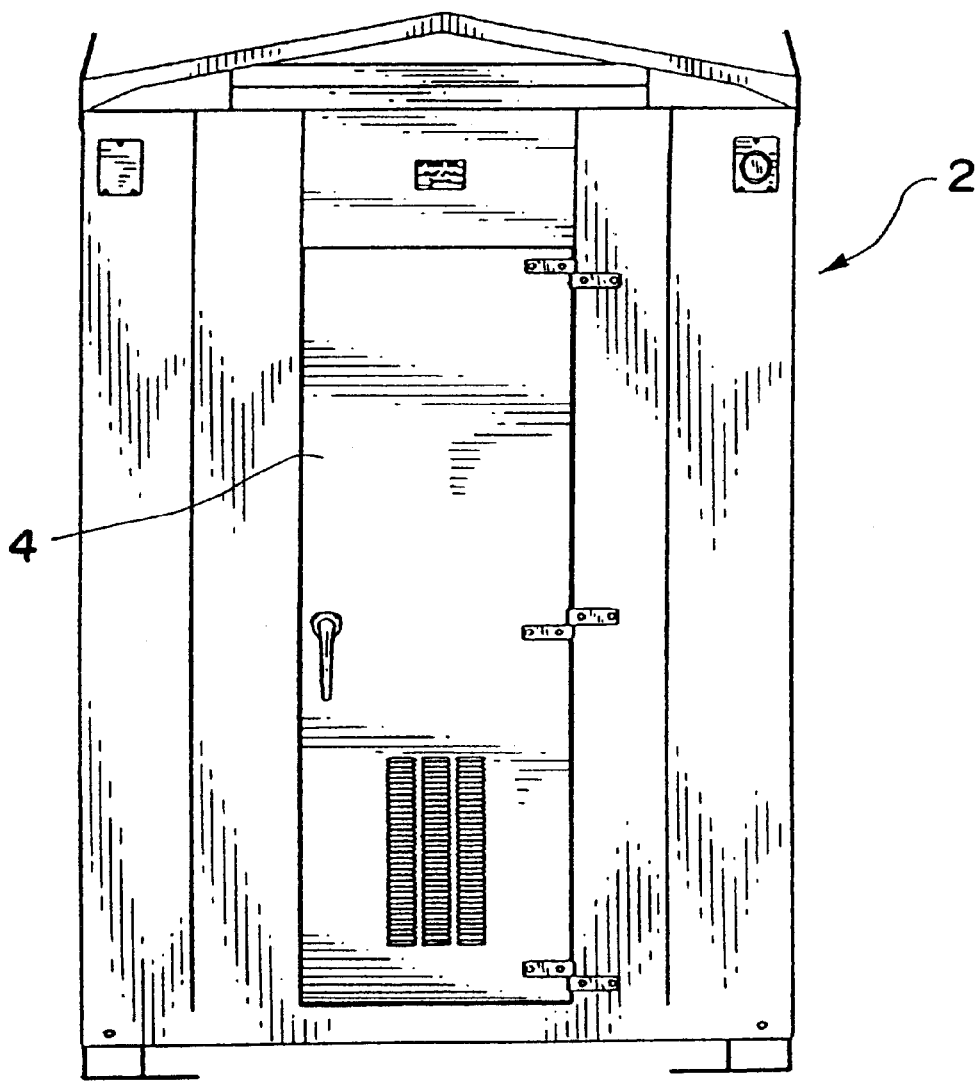
FIG. 1 is a front view of an exemplar house of the instant invention.

FIG. 1 is a view of the front of an exemplar house 2 of the instant invention. House 2 in this instance may be a switch house used in a train environment in which the house is located adjacent the railroad tracks of a railroad system. A number of such houses are spaced anywhere from ¾ miles to 1½ miles along the length of the tracks. Moreover, such switch house is placed at railroad crossing for controlling the lowering or raising of gates to prevent traffic from crossing the railroad tracks when a train is about to pass that crossing. As shown, house 2 has an entrance door 4.

Figure 2:
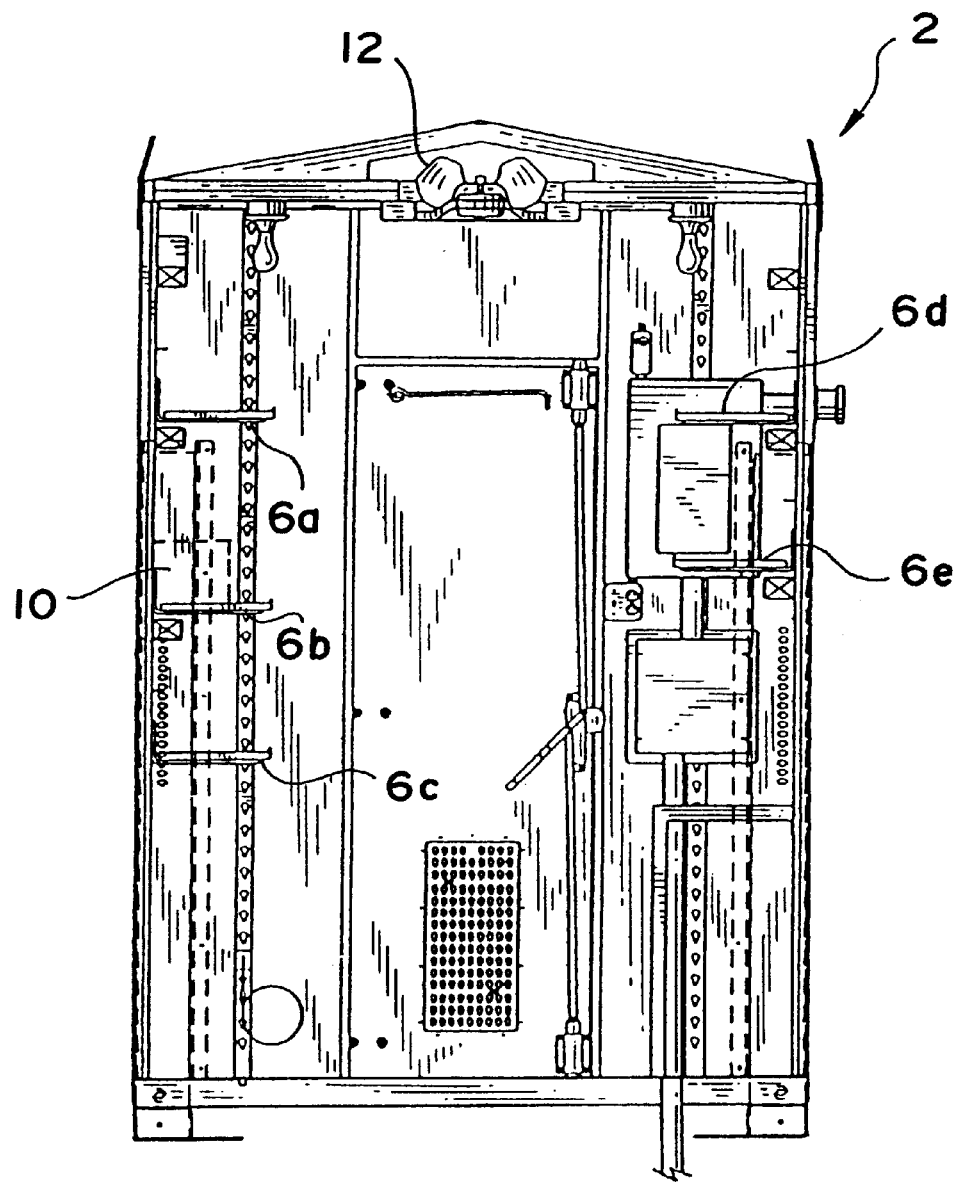
FIG. 2 is an inside view of the front wall of the house of the instant invention.
Figure 3:
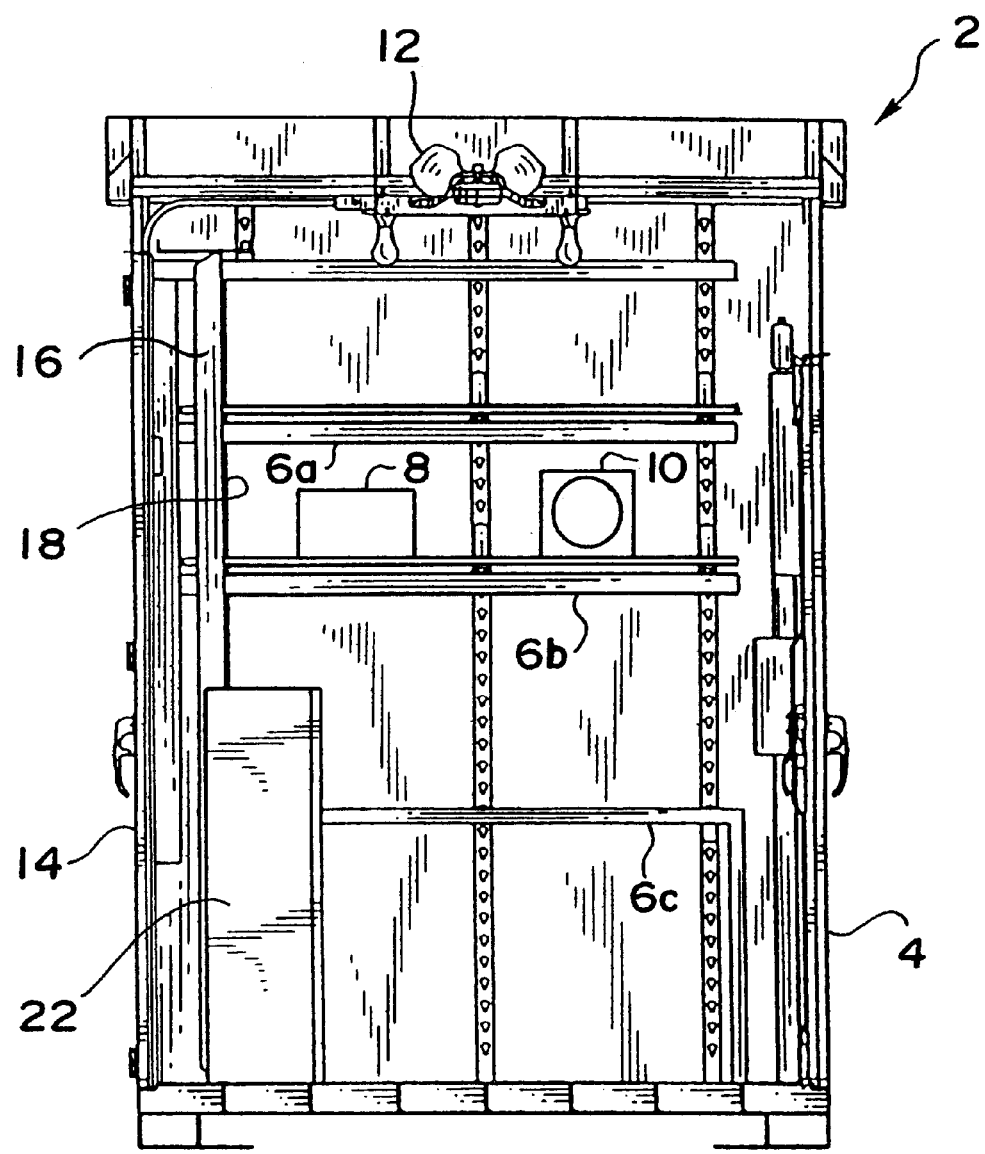
FIG. 3 is a cut away side view of the house of the instant invention.

As shown in FIGS. 2 and 3, the interior of house 2 has secured thereto a number of shelves 6a to 6c. These shelves are used for storing electrical or electronic equipment such as for example 8 and 10 shown stored onto shelves 6b. The air inside house 2 is circulated by means of an exhaust fan 12. As best shown in FIG. 3, in addition to front door 4, a back door 14 is provided to the back wall of house 2 so as to allow a technician to access the back of a frame 16 to which a terminal board 18, which may be made of plywood, is mounted. Overlaying terminal board 18 is a ground plane 20, best shown in FIG. 6. Ground plane 20 is conductive and may be made of ferrous or non-ferrous metal.

Figure 5:
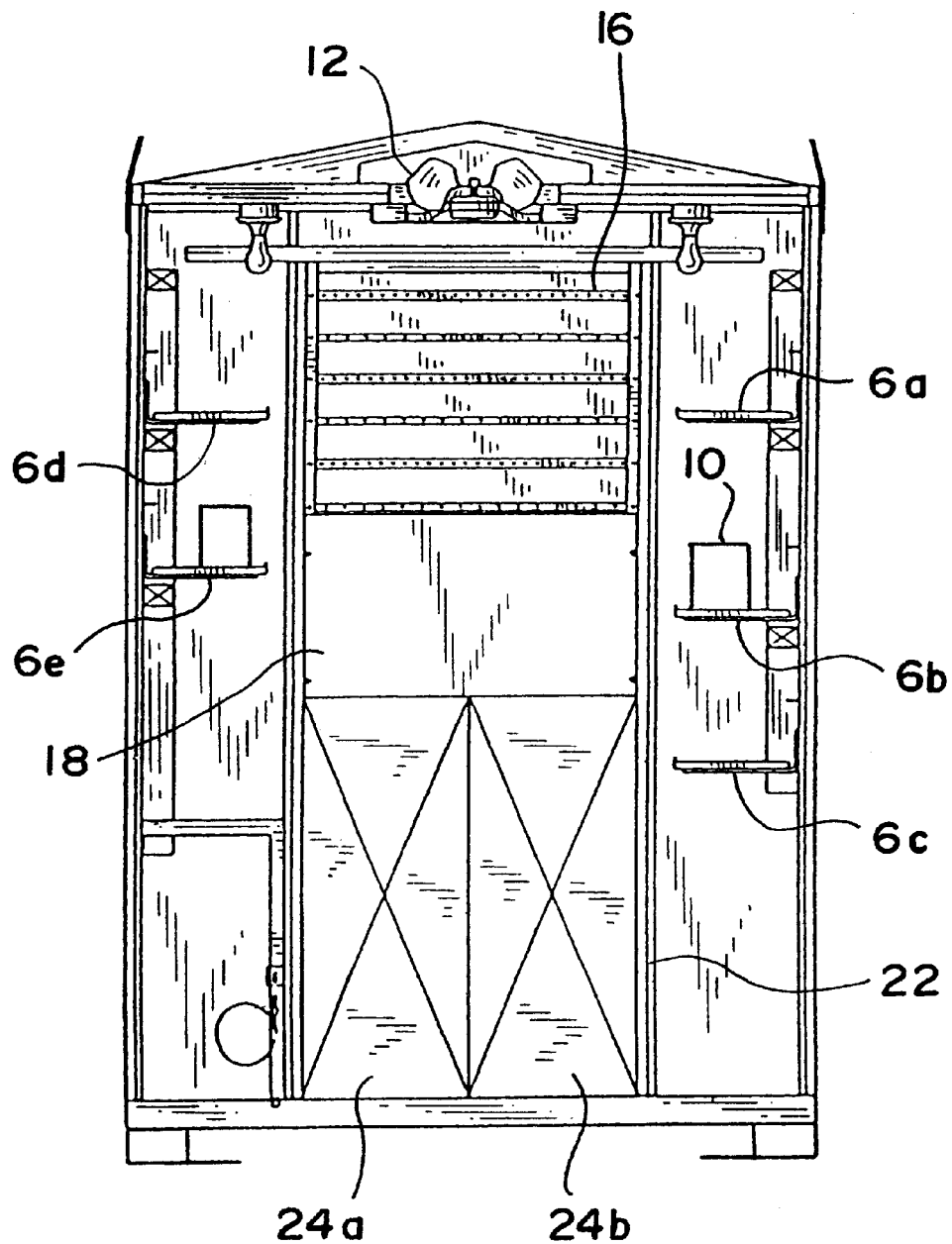
FIG. 5 is an inside view of the back of the house of the instant invention.
Figure 8:
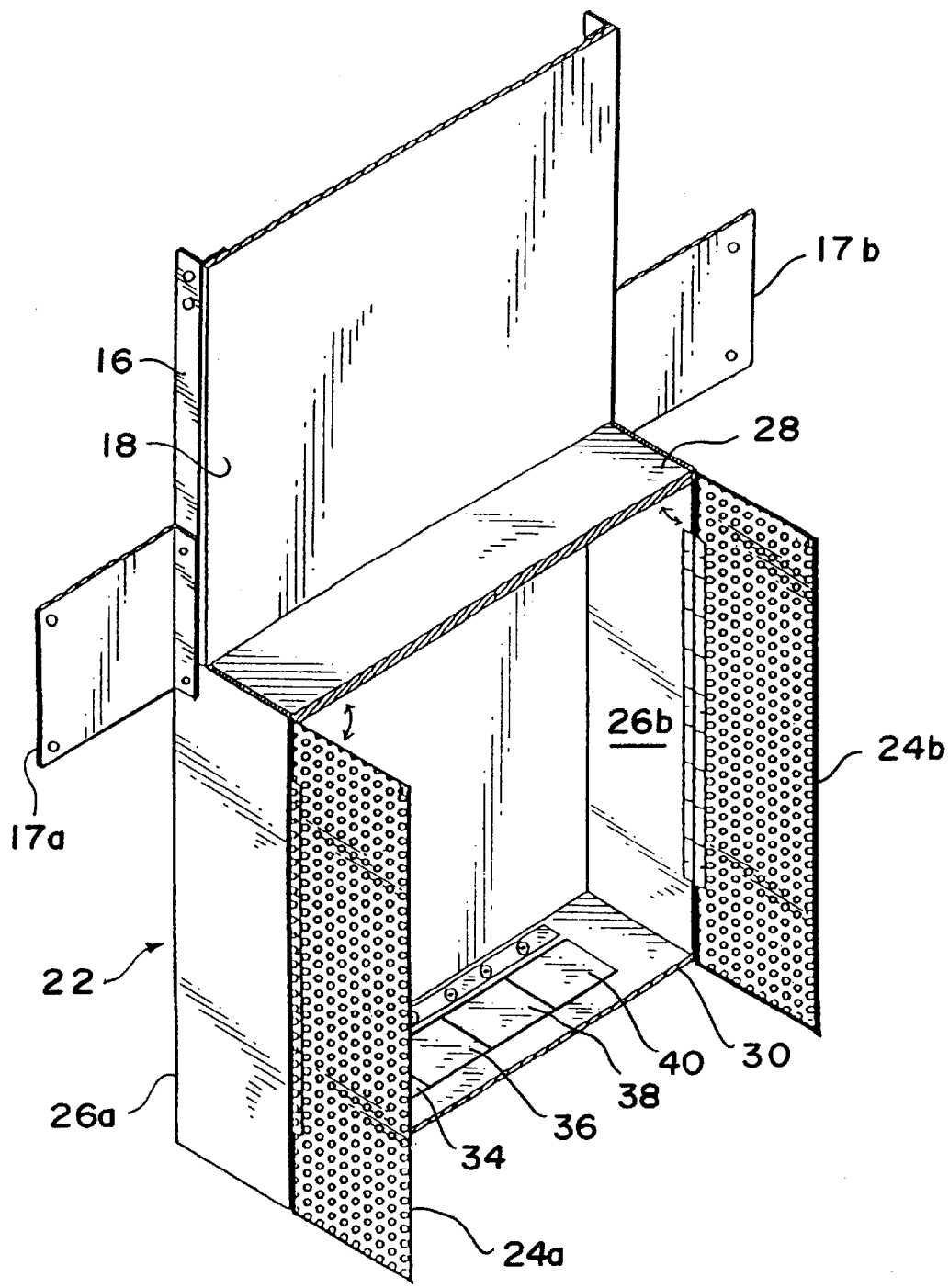
FIG. 8 is a perspective view of a shield structure placed over the terminal board of the house of the instant invention.

A cage 22, a perspective view of which is shown in FIG. 8, covers a portion of terminal board 18. As shown in FIGS. 5 and 8, cage 22 has two front doors 24a and 24b each hingedly mounted to a side panel such as for example panels 26a and 26b, respectively. Cage 22 also has a top panel 28. Note that although doors 24a and 24b each are shown as a grid, in practice, doors 24a and 24b may be solid panels or sheets. In essence, cage 22 is made up of a number of interconnected panels, or sheets which together, provide a shield enclosure or structure for shielding at least a portion of terminal board 18.

Figure 4:
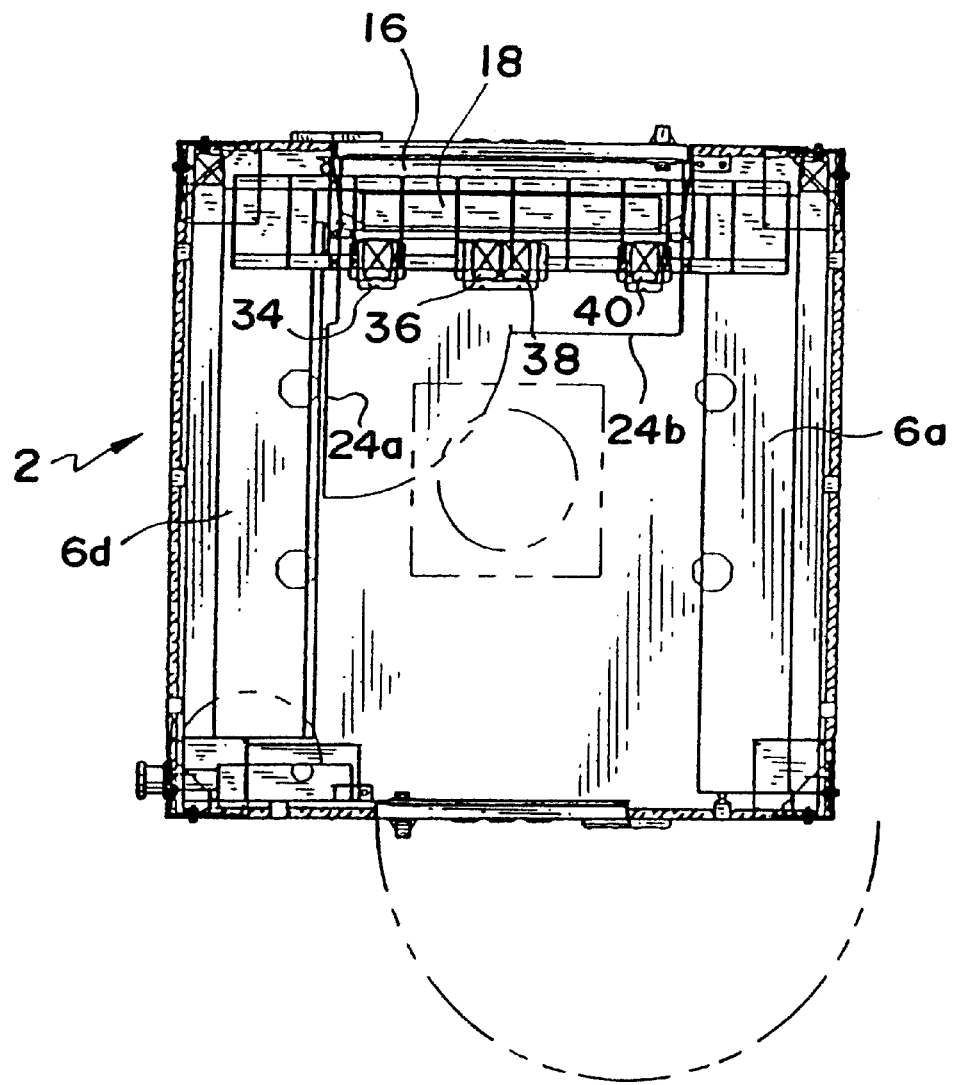
FIG. 4 is a plan view of the house of the instant invention.

As best shown in FIGS. 4 and 8, on the floor of housing 2 positioned in front of terminal board 16 are a number of openings 34, 36, 38 and 40 on floor 30. At least one of these openings provides an inlet or port for electrical connections such as wires external of house 2 to be fed into the interior of house 2. Such external wires, designated by 42 in FIG. 6, may be referred to as outside wires or "dirty" wires.

Figure 6:
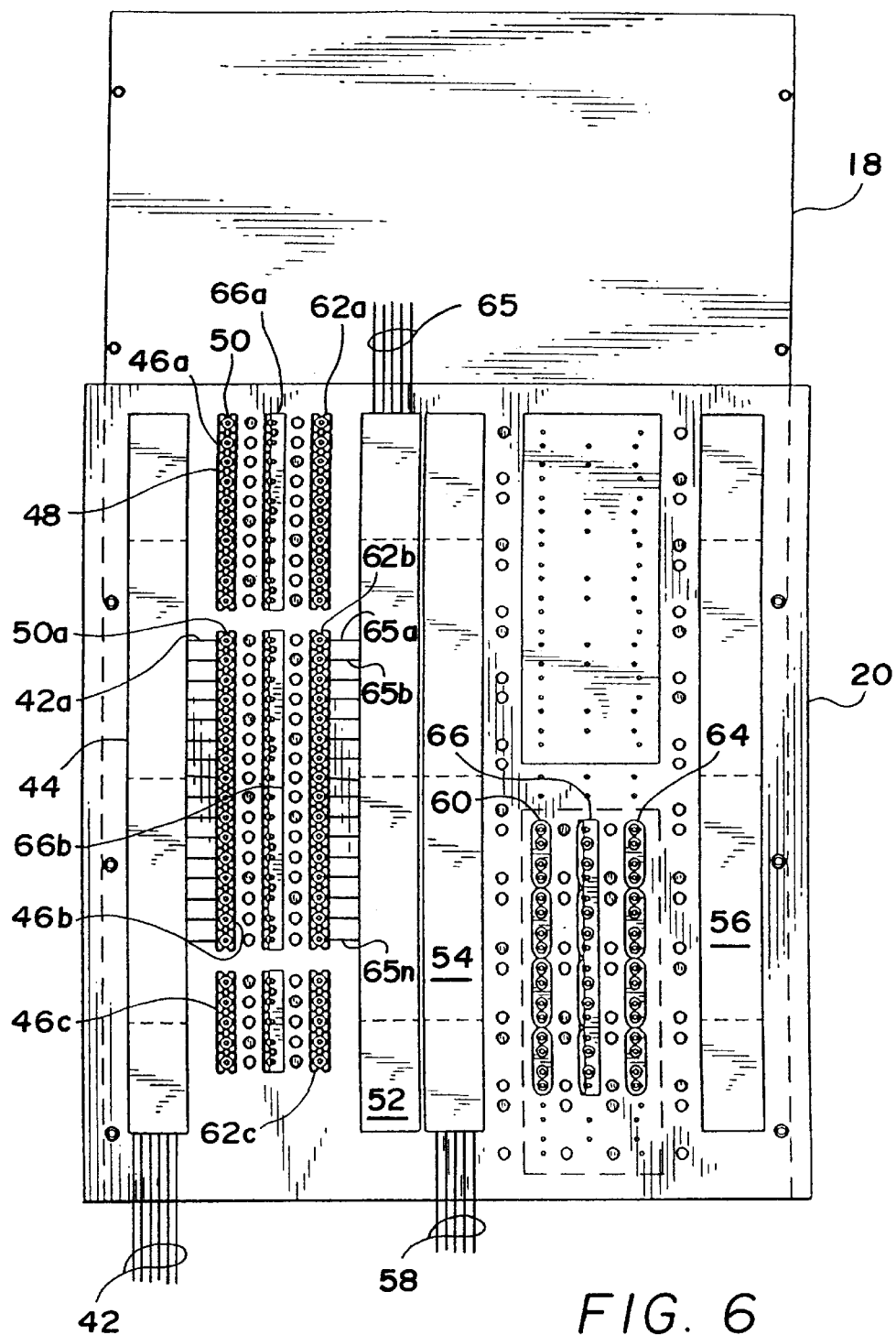
FIG. 6 illustrates the terminal board secured to the house of the instant invention.

As shown in FIG. 6, the outside wires 42 are fed into a panduit 44 at terminal board 18, and then separated and routed to a number of terminal blocks 46a, 46b and 46c.

Each of the terminal blocks 46 has an insulating base 48 and a number of posts 50. Thus, outside wire 42a output from panduit 44 is shown to be connected to post 50a at terminal block 46b. Similarly, other wires from outside of house 2 are connected to terminal blocks 46. See for example the many wires 42 connected to their respective posts 50 at terminal block 46b.

Further with reference to FIG. 6, it can be seen, that terminal board 18, and specifically the ground plane 20 superposed thereover, has a number of panduits, including panduits 52, 54 and 56. Note that each one of panduits 52, 54, 56, as well as panduit 44, can have bundled therein a plurality of wires, such as for example outside wires 42 in panduit 44 and another set of wires 58 shown bundled within panduit 54. Note that wires 58, for the embodiment being discussed, could also be wires that are led into house 2 from the outside. In fact, outside wires 58 may be led into house 2 by way of inlet opening 38, as shown in FIGS. 4 and 8. Outside wires 58 are in turn connected to a terminal block 60.

In addition to terminal blocks 46 and 60, there are also shown a number of other terminal blocks such as for example 62a, 62b, 62c and 64, coupled to terminal board 18. Like terminal block 46, each of terminal blocks 62 and 64 has an insulating base section and a plurality of posts integrated thereto.

There are a number of wires 65 each connected to a corresponding post at terminal 62b, as shown in the exemplar terminal board 18 of FIG. 6. These wires 65 may be referred to as inside or "clean" wires that are electrically connected to the equipment inside house 2. Each of the inside wires is connected to a corresponding outside wire at the back of terminal board 18. Thus, signals can traverse between the equipment in house 2 and any instruments or sensors that are situated outside of house 2, as for example sensors or switches mounted to the railroad tracks that are shunted when passed over by the axles of a train.

Figure 7:
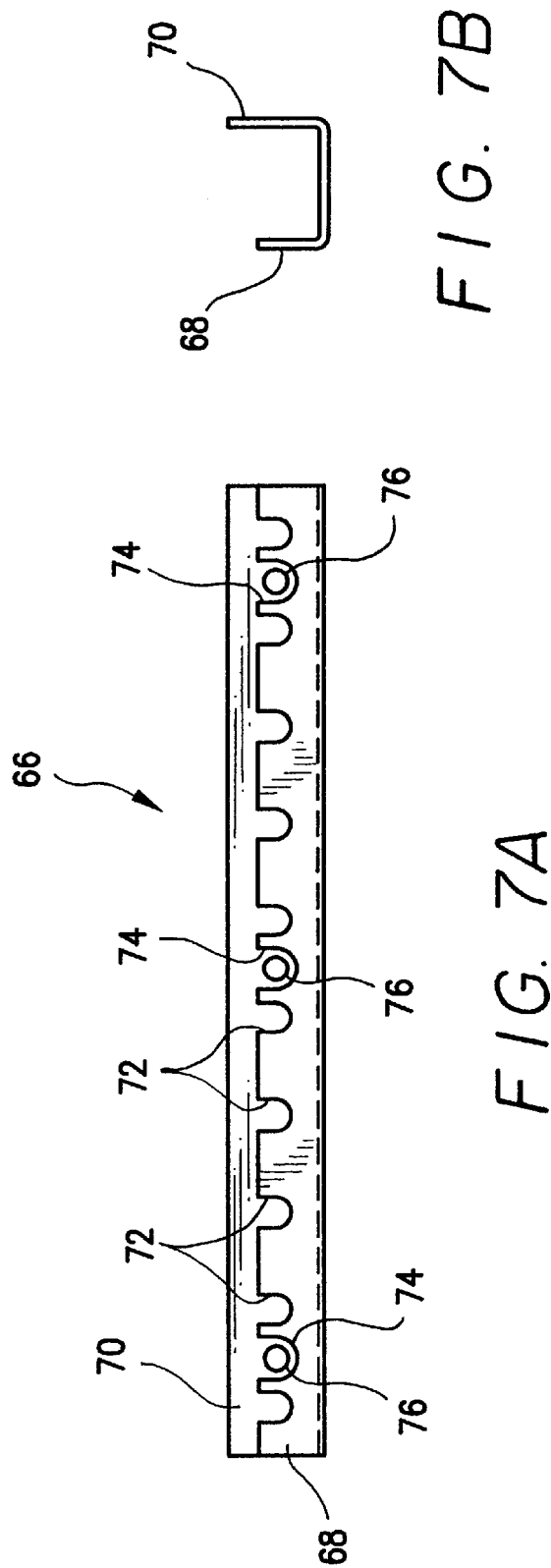

Further with respect to FIG. 6, also shown to be coupled to terminal board 18 are a number of terminal cover strips 66. As best shown in FIGS. 7a and 7b, terminal cover strip 66 is an elongated member having a shorter end 68 and a longer end 70 up bending along the longitudinal axis of member 66 to thereby form a U-shaped member as shown in FIG. 7b. Upbent portion 68 has cut thereinto a number of semicircular notches 72 and a number of bigger notches 74. Notches 72 are openings whereat connections may be made by means of screws and nuts of electrical conductors of adjacent posts, for example the wires extending from posts 50 of terminal block 46. Instead of electrical conductors, a lightning or surge arrester could be connected from one of the notches 72 to a corresponding post at terminal block 46.

On the longer up-bent portion 70 of cover strip 66 there are provided a number of holes 76 for enabling the coupling of strip 66 to terminal board 18, by means of screws or bolts, as shown in FIG. 6. Note that although the exemplar terminal strip shown in FIG. 7a shows a strip that corresponds to strip 66a shown in FIG. 6, in actuality, a cover strip of any length, such as for example strip 66b shown in FIG. 6, may be produced. In other words, it is not the length of strip 66 that matters, but rather that strip 66 is formed as a U-shaped member that has the appropriate notches and openings to enable it to be mounted to a terminal board and be connected to ground via the conductive ground plane overlying the terminal board. Prior to the instant inventive terminal strip, a plurality of distinct ground terminals are required for providing electrical connection to a plurality of wires, such as for example the dirty wires 42 from outside of house 2. Note that another cover strip 66 is provided between terminal blocks 60 and 64.

With reference to FIG. 8, it can be seen that terminal board 18 is mounted to frame 16, which in turn is secured to house 2 by means of brackets 17a and 17b. Further with respect to FIG. 8, note that panels 24, 26, 28 and 30 which together make up shield structure 22, like ground plane 20, are made of ferrous or non-ferrous metals such as for example aluminum or stainless steel. Furthermore, other types of conductive materials, be they ferrous or non-ferrous, may be used. They include a woven metallic material that can easily be shaped or a wire grid such as for example doors 24a and 24b shown in FIG. 8.

Figure 9:
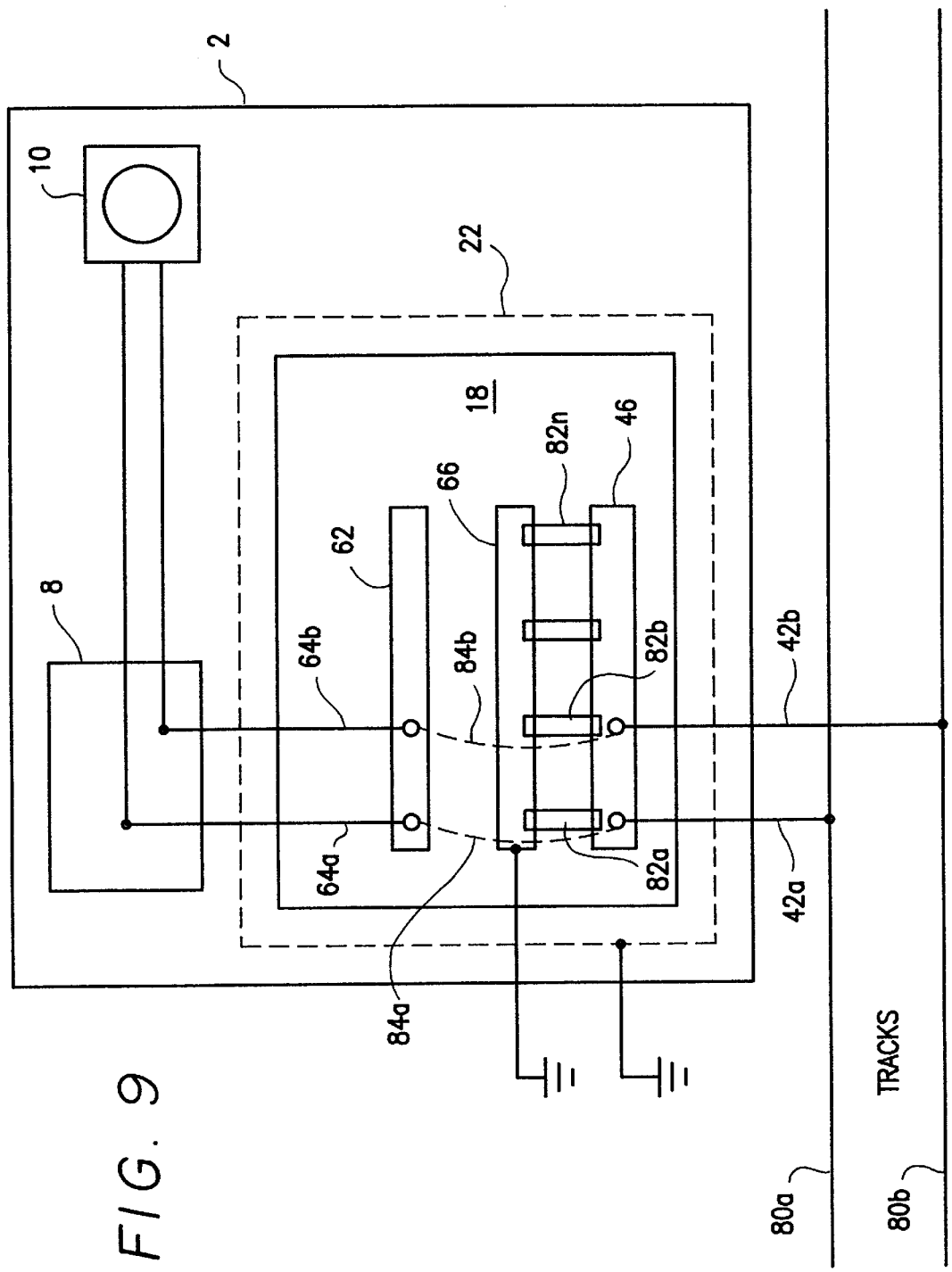
FIG. 9 is a schematic illustrating the interconnections between exemplar railroad tracks, the wires connected from the tracks to the house of the instant invention and the inside wires that route the signals from the railroad tracks to the equipment inside the house.

FIG. 9 is a simplified diagram for illustrating the principle of the instant invention. In particular, house 2 is shown to be located adjacent, or proximate, to a path, represented by rails 80a and 80b, of a plurality of railroad tracks whereon trains traverse. Although not shown, it should be appreciated that in addition to sensors and switches provided on the railroad tracks such as for example rails 80, the equipment in house 2 may also be communicating with at least one central control center that oversees the respective operations of the various trains.

In any event, as shown in FIG. 9, switches or sensors provided on rails 80 are routed to house 2 by means of outside wires 42a and 42b. These outside wires, as described hereinabove, are fed into house 2 at terminal board 18, and specifically connected to respective posts at a terminal block, such as for example terminal block 46. These outside wires each in turn are connected by a corresponding lightning or surge arrester 82 to a terminal strip that is connected to ground. Outside wires 42 are shown to be connected, by means of dotted lines 84, to inside wires 65, which are connected to terminal block 62. The inside wires 65 in turn are connected to an electronic equipment 8 such as for example a Harmons Vital Logic Controller (VHLC) that controls the communication between house 2 and the tracks. To enable a worker to monitor the goings on of the trains, the signals may be routed from the VHLC to another equipment, such as for example oscilloscope 10.

To protect equipment such as for example 8 and 10 inside house 2 from power surges that may get inside house 2, a shielding structure 22, such as for example the Faraday cage shown in FIG. 8, is placed around terminal board 18, or at least the portion thereof to which both the outside wires 42 and inside wires 65 are mounted. Structure 22 is electrically connected to ground. Likewise, terminal plane 20 that superposes over or overlies terminal board 18, the ground terminal strip 66, as well as house 2 itself, are all connected to ground.

In most instances, power surges would enter into railroad switch houses as a result of lightning striking either the house directly or the railroad tracks. In the case of the railroad tracks being struck by lightning, the power surges resulting from the lightning are fed by outside wires 42 into house 2 and routed to terminal board 18. Before the instant invention, the lightning, instead of or inspite of being partially routed by lightning arresters 82 to ground, would oftentimes jump over the lightning arresters into the rest of the house, so as to cause damage to the electronic or electrical equipment inside house 2.

By incorporating a Faraday case 22 around terminal board 18, the power surges that otherwise would have destroyed the equipment inside house 2 are prevented from doing so insofar as the conductive panels of structure 22 would confine the power surges within structure 22, so that the power surges are routed to ground. Thus, cage 22 acts as a means to isolate the equipment in house 2 from the surge currents that are routed to terminal board 18 of house 2. To enhance performance, shield structure 22 should preferably be made of the same conductive material as ground plane 20. Also, if house 2 is made of either aluminum or stainless steel, shield structure 22 likewise should preferably be made of either aluminum or stainless steel, respectively.

Inasmuch as the present invention is subject to many variations, modifications and changes in detail, it is intended that all matters described throughout this specification and shown in the accompanying drawings be interpreted as illustrative only and not in a limiting sense. For example, even though the discussion above pertains to railroads switch houses, it should be appreciated that the same shield structure may be used in other housing structures that may contain electrical or electronic components that could be exposed to surge currents resulting from lightnings or transient power surges from power lines. Accordingly, it is intended that the invention be limited only the spirit and scope of the hereto appended claims.

What is claimed is:

1. In a housing structure provisioned to protect against power surges and lightning strikes, a terminal board in said structure providing a junction whereto wires from inside and outside of said structure are mounted, a terminal cover strip in said housing structure comprising:

an electrically conductive elongated member mounted to said terminal board, said elongated member having a plurality of mounting spaces to which a multiple number of said wires are connected, said member being electrically grounded so that all wires connected to said member are also electrically grounded;

wherein said elongated member further comprises a base and two upbent sides extending substantially perpendicularly from said base along the longitudinal length of said member for effecting a U-shaped member, one of said two upbent sides being shorter than the other of said two upbent sides.

2. In a structure provisioned to protect against power surges and lightning strikes, a terminal board in said structure providing a junction whereto wires from inside and outside of said structure are mounted, a method of efficiently grounding said wires comprising the steps of:

forming an elongated terminal strip from an electrically conductive material; and mounting said strip to said terminal board, said strip having a plurality of mounting spaces to which a multiple number of said wires are connected, said strip being electrically grounded so that all wires connected to said strip are also electrically grounded;

wherein said forming step further comprises the steps of:

extending two upbent sides substantially perpendicularly from a base of said strip along the longitudinal length of said strip for effecting a U-shaped member; and forming one of said two upbent sides shorter than the other of said two upbent sides.

3. Method of claim 2, wherein said mounting step further comprises the steps of:

forming a first plurality of holes along one side of said strip for said wires to be coupled to said one side, said first plurality of holes being of at least two different sizes;

forming a second plurality of holes along another side of said strip for enabling said strip to be mounted to a ground plane on said terminal board; and coupling said other side of said strip to said ground plane using said second plurality of holes so that, once coupled to said ground plane, said strip effects an electrical path to route aberrant power surges carried by said wires to ground.

* * * * *